(12) United States Patent
Iwata et al.

(10) Patent No.: US 9,424,977 B2
(45) Date of Patent: Aug. 23, 2016

(54) THERMALLY CONDUCTIVE SILICONE ADHESIVE COMPOSITION FOR REACTOR AND REACTOR

(71) Applicants: SHIN-ETSU CHEMICAL CO., LTD., Tokyo (JP); TOYOTA JIDOSHA KABUSHIKI KAISHA, Toyota-shi, Aichi (JP)

(72) Inventors: Mitsuhiro Iwata, Annaka (JP); Masami Kobayashi, Nagoya (JP); Koji Nakanishi, Toyota (JP); Hiroyuki Imanishi, Toyota (JP); Hikohito Yamazaki, Toyota (JP)

(73) Assignees: SHIN-ETSU CHEMICAL CO., LTD., Tokyo (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/889,560

(22) PCT Filed: May 2, 2014

(86) PCT No.: PCT/JP2014/062169
§ 371 (c)(1),
(2) Date: Nov. 6, 2015

(87) PCT Pub. No.: WO2014/185296
PCT Pub. Date: Nov. 20, 2014

(65) Prior Publication Data
US 2016/0086713 A1   Mar. 24, 2016

(30) Foreign Application Priority Data

May 16, 2013 (JP) .................... 2013-103881

(51) Int. Cl.
*H01F 27/08* (2006.01)
*H01F 27/00* (2006.01)
(Continued)

(52) U.S. Cl.
CPC . *H01F 27/08* (2013.01); *C09J 9/00* (2013.01); *C09J 11/04* (2013.01); *C09J 183/04* (2013.01);
(Continued)

(58) Field of Classification Search
CPC .................... H01F 27/00–27/36; B25F 5/02
USPC ............. 336/90, 96, 233, 206–208, 210–214; 492/46, 53, 56
See application file for complete search history.

(56) References Cited

U.S. PATENT DOCUMENTS 4,293,477 A   10/1981   Theodore
5,352,731 A   10/1994   Nakano et al.
(Continued)

FOREIGN PATENT DOCUMENTS

JP   47-32400   11/1972
JP   56-100849 A   8/1981
(Continued)

OTHER PUBLICATIONS

International Search Report, issued in PCT/JP2014/062169, dated Jul. 15, 2014.
(Continued)

*Primary Examiner* — Tuyen Nguyen
(74) *Attorney, Agent, or Firm* — Birch, Stewart, Kolasch & Birch, LLP

(57) ABSTRACT

A thermally conductive silicone adhesive composition for a reactor, having good fluidity even when containing a large amount of thermally conductive filler to obtain a thermally conductive silicone adhesive composition, permitting potting of fine substrates, having good properties after curing, having little change in properties even with heat or moist-heat aging, and giving good adhesiveness to metals and organic resins, and a reactor potted by this composition, can be provided by making a thermally conductive silicone adhesive composition having a viscosity of 100 mPa·s at 25° C. and containing a liquid organohydrogenpolysiloxane having 2-10 hydrogen atoms bonded with silicon atoms in the molecule, containing no alkoxy groups, having at least one epoxy group bonded with a silicon atom via an alkylene group, having a polysiloxane degree of polymerization of 15 or lower, and containing a polysiloxane skeleton having a cyclic structure.

6 Claims, 1 Drawing Sheet

Figure 1A:
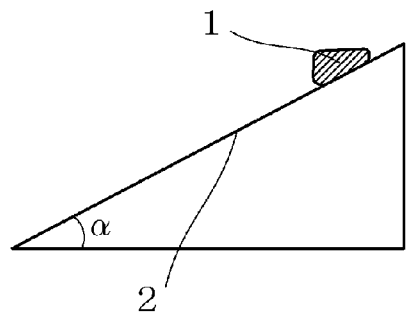
Figure 1C:
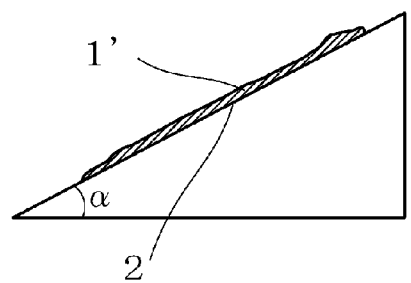
Figure 1B:
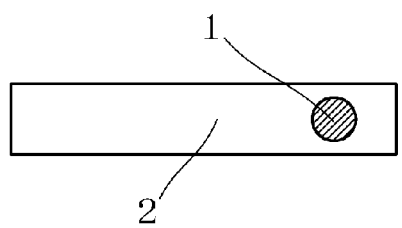
Figure 1D:
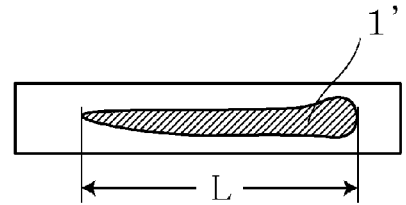

(51) Int. Cl.
  *H01F 27/02* (2006.01)
  *H01F 27/06* (2006.01)
  *C09J 11/04* (2006.01)
  *C09J 183/04* (2006.01)
  *H01F 37/00* (2006.01)
  *C09K 5/14* (2006.01)
  *H01F 27/22* (2006.01)
  *C09J 9/00* (2006.01)
  *C09J 183/06* (2006.01)
  *C09K 5/08* (2006.01)
  *C08K 7/18* (2006.01)

(52) U.S. Cl.
  CPC ............... *C09J 183/06* (2013.01); *C09K 5/08* (2013.01); *C09K 5/14* (2013.01); *H01F 27/00* (2013.01); *H01F 27/02* (2013.01); *H01F 27/022* (2013.01); *H01F 27/06* (2013.01); *H01F 27/22* (2013.01); *H01F 37/00* (2013.01); *C08K 7/18* (2013.01)

(56) References Cited

U.S. PATENT DOCUMENTS

| | | | |
|---|---|---|---|
| 6,261,214 B1 * | 7/2001 | Meguriya | C08K 7/24 492/46 |
| 6,306,957 B1 | 10/2001 | Nakano et al. | |
| 2003/0032753 A1 * | 2/2003 | Meguriya | C08L 83/04 528/10 |
| 2009/0298980 A1 * | 12/2009 | Yoshitake | C08K 5/50 524/154 |
| 2010/0140538 A1 | 6/2010 | Sekiba | |

FOREIGN PATENT DOCUMENTS

| | | |
|---|---|---|
| JP | 62-18475 A | 1/1987 |
| JP | 64-69661 A | 3/1989 |
| JP | 4-328163 A | 11/1992 |
| JP | 2000-256558 A | 9/2000 |
| JP | 2003-261769 A | 9/2003 |
| JP | 2008-239719 A | 10/2008 |
| JP | 2009-94328 A | 4/2009 |
| JP | 2011-122000 A | 6/2011 |
| JP | 2012-67153 A | 4/2012 |

OTHER PUBLICATIONS

Written Opinion of the International Searching Authority, issued in PCT/JP2014/062169, dated Jul. 15, 2014.

* cited by examiner

THERMALLY CONDUCTIVE SILICONE ADHESIVE COMPOSITION FOR REACTOR AND REACTOR

TECHNICAL FIELD

This invention relates to a heat conductive silicone adhesive composition for use with reactors, which even when heavily loaded with a heat conductive filler so that the composition may be highly heat conductive, maintains good flow, can be potted around delicate substrates, has good physical properties after curing, experiences little changes of physical properties upon heat or moist-heat aging, and has good adhesion to metals and organic resins, and a reactor potted in the composition.

BACKGROUND ART

Since heat-generating parts such as power transistors and thyristors degrade their characteristics by the heat generated, a countermeasure is taken in the prior art upon installation by attaching a heat sink to the heat-generating part so that the heat may be dissipated and released to a metallic chassis of the apparatus. In this case, a heat-dissipating insulating sheet of silicone rubber loaded with heat conductive filler is used between the heat-generating part and the heat sink for the purpose of improving electrical insulation and thermal conductivity.

As the material of heat-dissipating insulating sheets, JP-A S47-32400 (Patent Document 1) discloses an insulating composition comprising 100 parts by weight of a synthetic rubber such as silicone rubber and 100 to 800 parts by weight of at least one metal oxide selected from beryllium oxide, aluminum oxide, aluminum oxide hydrate, magnesium oxide, and zinc oxide. As the heat-dissipating material used where insulation is unnecessary, JP-A S56-100849 (Patent Document 2) discloses an addition curable silicone rubber composition loaded with 60 to 500 parts by weight of silica and a heat conductive powder such as silver, gold or silicon. However, these heat conductive materials have a thermal conductivity of up to 1.5 W/m·K. There is left the problem that if the composition is heavily loaded with a heat conductive filler for increasing thermal conductivity, fluidity is reduced and molding or working ability is extremely exacerbated.

As one solution to this problem, JP-A H01-69661 (Patent Document 3) discloses a highly heat conductive rubber/plastic composition comprising alumina in the form of spherical corundum particles of cutting edge-free shape consisting of 10 to 30% by weight of alumina particles with an average particle size of up to 5 µm and the balance of single particles with an average particle size of at least 10 m. Also, JP-A H04-328163 (Patent Document 4) discloses a heat conductive silicone rubber composition comprising 100 parts by weight of a base polymer which is a mixture of a gum-like organopolysiloxane having an average degree of polymerization of 6,000 to 12,000 and an oily organopolysiloxane having an average degree of polymerization of 200 to 2,000 and 500 to 1,200 parts by weight of spherical aluminum oxide particles. On use of either of these compositions, however, merely the combination of particles and the viscosity adjustment of silicone base are insufficient to improve molding or working ability when it is attempted to load 100 parts by weight of the base polymer component with at least 1,000 parts by weight of aluminum oxide powder (i.e., at least 70% by volume of aluminum oxide).

As the means for improving molding or working ability, JP-A 2000-256558 (Patent Document 5) discloses a heat conductive silicone rubber composition containing 0.1 to 50% by volume of a hydrolyzable group-containing methylpolysiloxane as wetter. Although the heat conductive silicone rubber composition is improved in molding or working ability by this means, its adhesion to substrates is still insufficient. Also, JP-A 2008-239719 (Patent Document 6) discloses a silicone elastomer composition capable of forming a silicone elastomer experiencing a reduced hardness change upon heat aging. While an adhesion test to aluminum substrates is described, there is left the problem that its adhesion to organic resins is insufficient. As described above, an attempt to load a heat conductive silicone composition with a large amount of heat conductive filler such as alumina for the purpose of enhancing the thermal conductivity thereof encounters the problem that the cured physical properties are substantially degraded.

Also, power control units mounted on advanced hybrid cars, electric vehicles and fuel cell vehicles need a reactor for applying the battery voltage across the motor after boosting up. In conjunction with the trend toward space saving and size reduction of the power control unit, the reactor as one component of the unit is also required to be compact and its internal structure currently becomes more miniaturized and complicated. Additionally, the reactor interior reaches high temperature. It is urgently desired to develop a heat conductive silicone adhesive composition for use with reactors having a high heat dissipation capability of at least 0.5 W/m·K and experiencing minimized changes of physical properties on heat or moist-heat aging at the same time.

JP-A 2011-122000 (Patent Document 7) discloses a silicone composition as heat conductive potting compound, which maintains good flow and effective potting around reactor components and has good physical properties after curing, even when heavily loaded with a heat conductive filler so that the composition may be highly heat conductive, and a method for selecting a heat conductive potting compound, but refers nowhere to changes of physical properties after heat or moist-heat aging. The composition is still insufficient in this respect.

PRIOR ART DOCUMENTS

Patent Documents

Patent Document 1: JP-A S47-32400
Patent Document 2: JP-A S56-100849
Patent Document 3: JP-A H01-69661
Patent Document 4: JP-A H04-328163
Patent Document 5: JP-A 2000-256558
Patent Document 6: JP-A 2008-239719
Patent Document 7: JP-A 2011-122000

SUMMARY OF THE INVENTION

Problems to be Solved by the Invention

An object of the invention, which has been made under the above circumstances, is to provide a heat conductive silicone adhesive composition for use with reactors, which even when heavily loaded with a heat conductive filler so that the composition may be highly heat conductive, maintains good flow, can be potted around delicate substrates, has good physical properties after curing, experiences little changes of physical properties even with heat or moist-heat aging, and has good adhesion to metals and organic resins, and a reactor potted in the composition.

Means for Solving the Problems

Making extensive investigations to attain the above object, the inventors have found a heat conductive silicone adhesive composition comprising a liquid organohydrogenpolysiloxane having a viscosity of up to 100 mPa·s at 25° C., containing 2 to 10 silicon-bonded hydrogen atoms in the molecule, free of alkoxy groups, containing at least one epoxy group bonded to a silicon atom via an alkylene group, the polysiloxane having a degree of polymerization of up to 15 and having a cyclic structure-containing skeleton, which even when heavily loaded with a heat conductive filler, maintains good flow, experiences little changes of physical properties with heat or moist-heat aging, and has good adhesion to metals and organic resins; and a reactor potted in the composition. The invention is predicated on this finding.

Accordingly, the invention provides a heat conductive silicone adhesive composition for use with reactors and a reactor potted in the composition as defined below.

[1] A heat conductive silicone adhesive composition for a reactor, comprising at least (A) 100 parts by weight of an organopolysiloxane containing at least two silicon-bonded alkenyl groups in the molecule and having a viscosity of 0.05 to 1,000 Pa·s at 25° C., (B) 0.01 to 30 parts by weight of a liquid organohydrogenpolysiloxane having a viscosity of up to 100 mPa·s at 25° C., containing 2 to 10 silicon-bonded hydrogen atoms (SiH groups) in the molecule, free of alkoxy groups, containing at least one epoxy group bonded to a silicon atom via an alkylene group, the polysiloxane having a degree of polymerization of up to 15 and having a cyclic structure-containing skeleton, (C) 5 to 4,000 parts by weight of a heat conductive filler, (D) an amount to promote cure of the composition of a hydrosilylation catalyst, (E) 0.1 to 100 parts by weight of an organopolysiloxane containing in the molecule at least one silyl group of the general formula (1):

$$SiR^1_a R^2_{3-a} \quad (1)$$

wherein $R^1$ is a substituted or unsubstituted monovalent hydrocarbon group, $R^2$ is an alkoxy or acyloxy group of 1 to 8 carbon atoms, and a is 0, 1 or 2, and having a viscosity of 0.01 to 30 Pa·s at 25° C., the polysiloxane having a cyclic structure-free skeleton, and (F) 0.01 to 10 parts by weight of acetylene black obtained from pyrolysis of acetylene and having a bulk density of 0.06 to 0.18 g/cm$^3$, a molar ratio of SiH groups in component (B) to alkenyl groups in component (A), that is, SiH/alkenyl being 0.2/1 to 5.0/1.

[2] The heat conductive silicone adhesive composition of [1] wherein component (B) is selected from organohydrogenpolysiloxanes having the following general formulae:

[Chemical Formula 1]

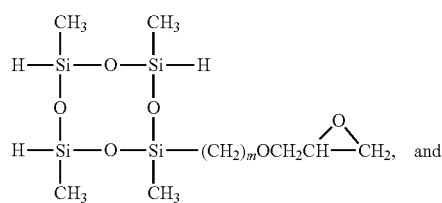

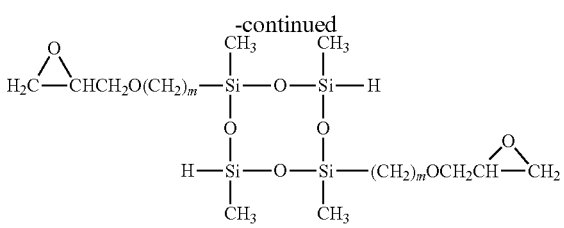

wherein m is an integer of 1 to 6.

[3] The heat conductive silicone adhesive composition of [1] or [2] wherein component (C) is at least one member selected from the group consisting of aluminum hydroxide, magnesium hydroxide, aluminum oxide, crystalline silica, zinc oxide, silicon oxide, silicon carbide, silicon nitride, magnesium oxide, titanium oxide, beryllium oxide, aluminum nitride, boron nitride, gold, silver, copper, iron, nickel, aluminum, and stainless steel.

[4] The heat conductive silicone adhesive composition of any one of [1] to [3] wherein component (E) is selected from among molecular chain dual end trimethoxysiloxy-blocked dimethylsiloxane,
molecular chain dual end trimethoxysiloxy-blocked dimethylsiloxane/methylvinylsiloxane copolymer,
molecular chain dual end trimethoxysiloxy-blocked methylvinylpolysiloxane,
molecular chain dual end trimethoxysiloxy-blocked dimethylsiloxane/methylvinylsiloxane/methylphenylsiloxane copolymer,
molecular chain dual end trimethoxysiloxy-blocked dimethylsiloxane/methylvinylsiloxane/diphenylsiloxane copolymer,
molecular chain dual end dimethoxymethylsiloxy-blocked dimethylpolysiloxane,
molecular chain dual end dimethoxyvinylsiloxy-blocked dimethylpolysiloxane,
molecular chain dual end dimethoxyvinylsiloxy-blocked methylvinylpolysiloxane,
molecular chain dual end dimethoxyvinylsiloxy-blocked dimethylsiloxane/methylvinylsiloxane copolymer,
molecular chain dual end dimethoxyvinylsiloxy-blocked dimethylsiloxane/methylvinylsiloxane/methylphenylsiloxane copolymer,
molecular chain dual end dimethoxyvinylsiloxy-blocked dimethylsiloxane/methylvinylsiloxane/diphenylsiloxane copolymer,
molecular chain dual end divinylmethoxysiloxy-blocked dimethylpolysiloxane, and
molecular chain single end trimethoxysiloxy-blocked dimethylsiloxane.

[5] The heat conductive silicone adhesive composition of any one of [1] to [4], having a thermal conductivity of at least 0.5 W/m·K in the cured state.

[6] A reactor potted in the heat conductive silicone adhesive composition of any one of [1] to [5].

Advantageous Effects of the Invention

The heat conductive silicone adhesive composition for use with reactors according to the invention, even when heavily loaded with a heat conductive filler so that the composition may be highly heat conductive, maintains good flow, can be potted around delicate substrates, has good physical properties after curing, experiences little changes of physical properties with heat or moist-heat aging, and has good adhesion to metals and organic resins. Also a reactor potted in the composition is provided. This ensures reliable performance of the reactor for applying the battery voltage across the motor after boosting up.

BRIEF DESCRIPTION OF THE DIAGRAMS

FIG. 1 illustrates how to evaluate the flow of a composition; FIGS. 1(A) and (B) are side and plan views of an aluminum plate which is inclined after the composition is dropped thereon; FIGS. 1(C) and (D) are side and plan views of the composition having flowed down.

Figure 2:
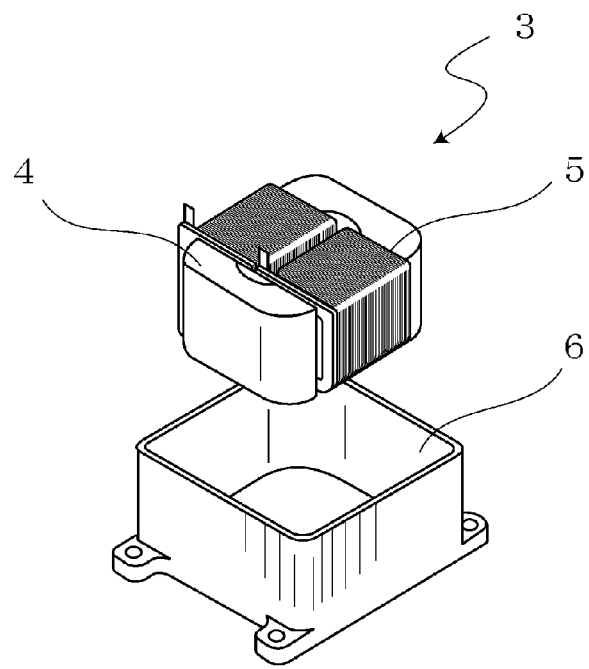

FIG. 2 illustrates components of a reactor.

EMBODIMENT FOR CARRYING OUT THE INVENTION

Below the invention is described in detail.
[Heat Conductive Silicone Adhesive Composition for Use with Reactors]

The heat conductive silicone adhesive composition of the invention cures at normal temperature or elevated temperature, is self-adhesive to metals and organic resins, and comprises (A) an alkenyl-containing organopolysiloxane, (B) a liquid organohydrogenpolysiloxane whose polysiloxane has a cyclic structure-containing skeleton, (C) a heat conductive filler, (D) a hydrosilylation catalyst, (E) an alkoxy or acyloxy-containing organopolysiloxane, and (F) acetylene black as essential components.
[Component (A)]

Component (A) serving as a base polymer in the composition is an organopolysiloxane containing at least two, preferably 2 to about 50, more preferably 2 to about 20 silicon-bonded alkenyl groups in the molecule and having a viscosity at 25° C. of 0.05 to 1,000 Pa·s, preferably 0.1 to 500 Pa·s. It is noted that the viscosity is measured by a rotational viscometer (the same applies hereinafter).

If the number of alkenyl groups is less than 2, the resulting composition may become uncurable. If the number of alkenyl groups exceeds 50, the cure of the resulting composition may be substantially retarded. If the viscosity at 25° C. is less than 0.05 Pa·s, the cured product of the resulting composition is unlikely to exhibit fully satisfactory physical properties and adhesion. If the viscosity at 25° C. exceeds 1,000 Pa·s, undesirably the resulting composition may be less flowable and difficulty workable.

The molecular structure of component (A) is not particularly limited, while exemplary structures include linear, partially branched linear, branched, cyclic, and branched cyclic structures. Most often, a substantially linear organopolysiloxane is preferred. Specifically, a linear diorganopolysiloxane whose molecular chain is mainly composed of recurring diorganosiloxane units and which is blocked with triorganosiloxy at both ends of the molecular chain is preferred. Also component (A) may be either a polymer consisting of siloxane units of one type or a copolymer consisting of siloxane units of more than one type. Further, the position of silicon-bonded alkenyl group in component (A) is not particularly limited, and the alkenyl group may be attached to either one or both of a silicon atom at the end of the molecular chain and a silicon atom at a non-terminal (or intermediate) position of the molecular chain.

Component (A) as defined above may be represented by the average compositional formula (2).

$$R^3{}_b R^4{}_c SiO_{(4-b-c)/2} \quad (2)$$

Herein $R^3$ is independently a substituted or unsubstituted monovalent hydrocarbon group free of aliphatic unsaturation, $R^4$ is independently alkenyl, b is typically a positive number of 0.7 to 2.2, preferably 1.8 to 2.1, and more preferably 1.95 to 2.0, c is typically a positive number of 0.0001 to 0.2, preferably 0.0005 to 0.1, and more preferably 0.01 to 0.05, b+c is typically a positive number of 0.8 to 2.3, preferably 1.9 to 2.2, and more preferably 1.98 to 2.05.

$R^3$ is selected from substituted or unsubstituted monovalent hydrocarbon groups of 1 to 10 carbon atoms, free of aliphatic unsaturation. Examples of $R^3$ include alkyl groups such as methyl, ethyl, propyl, isopropyl, butyl, isobutyl, tert-butyl, hexyl, octyl, and decyl; aryl groups such as phenyl, tolyl, xylyl and naphthyl; cycloalkyl groups such as cyclopentyl and cyclohexyl; aralkyl groups such as benzyl, 2-phenylethyl and 3-phenylpropyl; and substituted forms of the foregoing hydrocarbon groups in which some or all carbon-bonded hydrogen atoms are replaced by halogen atoms (e.g., chlorine, bromine, and iodine), cyano groups or the like, such as chloromethyl, 2-bromoethyl, 3,3,3-trifluoropropyl, and cyanoethyl. Among these, those compounds wherein $R^3$ is methyl, phenyl or a mixture thereof are preferred as component (A) because of ease of synthesis and chemical stability. Particularly when an organopolysiloxane having better solvent resistance is desired, it is preferred that $R^3$ be methyl, phenyl or a mixture thereof in combination with 3,3,3-trifluoropropyl.

$R^4$ is selected from alkenyl groups of 2 to 8 carbon atoms. Examples of $R^4$ include vinyl, allyl, 1-propenyl, isopropenyl, 1-butenyl, isobutenyl and hexenyl. Inter alia, vinyl is preferred. Those compounds wherein $R^4$ is vinyl are preferred as component (A) because of ease of synthesis and chemical stability.

Examples of component (A) include a molecular chain dual end trimethylsiloxy-blocked dimethylsiloxane/methylvinylsiloxane copolymer,
molecular chain dual end trimethylsiloxy-blocked methylvinylpolysiloxane,
molecular chain dual end trimethylsiloxy-blocked dimethylsiloxane/methylvinylsiloxane/methylphenylsiloxane copolymer,
molecular chain dual end trimethylsiloxy-blocked dimethylsiloxane/methylvinylsiloxane/diphenylsiloxane copolymer,
molecular chain dual end dimethylvinylsiloxy-blocked dimethylpolysiloxane,
molecular chain dual end dimethylvinylsiloxy-blocked methylvinylpolysiloxane,
molecular chain dual end dimethylvinylsiloxy-blocked dimethylsiloxane/methylvinylsiloxane copolymer,
molecular chain dual end dimethylvinylsiloxy-blocked dimethylsiloxane/methylvinylsiloxane/methylphenylsiloxane copolymer,
molecular chain dual end dimethylvinylsiloxy-blocked dimethylsiloxane/methylvinylsiloxane/diphenylsiloxane copolymer,
molecular chain dual end divinylmethylsiloxy-blocked dimethylpolysiloxane, and
molecular chain dual end trivinylsiloxy-blocked dimethylpolysiloxane.

These organopolysiloxanes may be used alone or in admixture of two or more while a mixture of organopolysiloxanes having different degrees of polymerization is also acceptable.
[Component (B)]

Component (B) is an organohydrogenpolysiloxane, which is liquid at room temperature (25° C.), having a viscosity at 25° C. of up to 100 mPa·s, preferably 1 to 100 mPa·s, containing 2 to 10, preferably 2 to 7, more preferably 2 to 4 silicon-bonded hydrogen atoms in the molecule, free of alkoxy groups, containing at least one epoxy group bonded to a silicon atom via an alkylene group, preferably 1 to 4, more preferably 1 or 2 epoxy groups, the polysiloxane having a degree of polymerization of up to 15, preferably 4 to 15, more preferably 4 to 8 and having a cyclic structure-containing skeleton. This organohydrogenpolysiloxane cures at normal temperature or elevated temperature and serves as a crosslinker and/or tackifier for rendering the composition self-adhesive to metals and organic resins.

If the number of silicon-bonded hydrogen atoms (SiH groups) is less than 2, the resulting composition may become uncurable. If the number of SiH groups exceeds 10, undesirably changes of physical properties after heat or moist-heat aging from initial physical properties may become significant. If the number of epoxy groups bonded to a silicon atom via an alkylene group is 0, self-adhesion may be lost. If the number of epoxy groups exceeds 4, the resulting composition may become unstable during storage. If the viscosity at 25° C. is less than 1 mPa·s or the degree of polymerization is less than 4, the cured product of the resulting composition is unlikely to exhibit fully satisfactory physical properties and adhesion. If the viscosity exceeds 100 mPa·s or the degree of polymerization exceeds 15, undesirably adhesion may be insufficient. As used herein, the degree of polymerization (or the number of silicon atoms in the molecule) may be determined as a number average value by gas chromatography/mass spectroscopy (GC/MS) or gel permeation chromatography (GPC) versus polystyrene standards.

Although the molecular structure of component (B) is not particularly limited, the skeleton of polysiloxane should contain a cyclic structure. The cyclic structure of polysiloxane is preferably a cyclic structure of 3 to 8 silicon atoms, most preferably 4 silicon atoms. Absent cyclic siloxane structure, workability, adhesion and heat resistance are insufficient.

Also, the molecular structure of component (B) should not contain alkoxy groups. The reason is that since alkoxy groups are susceptible to hydrolysis with moisture, the cured product of the composition would undergo substantial changes of physical properties, especially after moist-heat aging, from initial physical properties.

Preferred examples of component (B) are organohydrogenpolysiloxanes of the following general formulae.

[Chemical Formula 2]

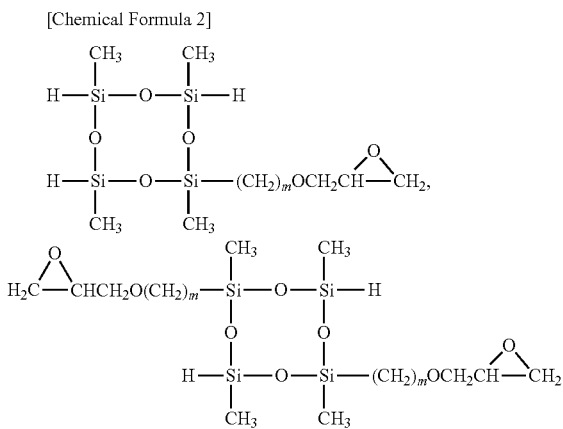

Herein m is an integer of 1 to 6, preferably 1 to 3, more preferably 2 or 3.

These organohydrogenpolysiloxanes may be used alone or in admixture of two or more.

The amount of component (B) blended is 0.01 to 30 parts, preferably 0.1 to 20 parts by weight per 100 parts by weight of the organopolysiloxane as component (A). Less than 0.01 part of component (B) may fail to attain a practically acceptable adhesion effect whereas more than 30 parts may adversely affect the physical properties of the cured composition after a heat resistance test.

Also component (B) is blended such that a molar ratio of SiH groups in component (B) to alkenyl groups in component (A), that is, SiH/alkenyl may be in the range from 0.2/1 to 5.0/1, preferably from 0.4/1 to 2/1. If the molar ratio is less than 0.2, the composition may be under-cured, or even when cured, the cured composition may have poor physical properties. If the molar ratio exceeds 5.0, undesirably the composition may be under-cured, or even when cured, physical properties of the cured composition may change after a heat resistance test.

[Component (C)]

Component (C) is a heat conductive filler which is added to increase the thermal conductivity of the composition.

The heat conductive filler is preferably inorganic powder and/or metal powder. For example, there may be used at least one inorganic powder selected from among aluminum hydroxide, magnesium hydroxide, aluminum oxide, crystalline silica, zinc oxide, silicon oxide, silicon carbide, silicon nitride, magnesium oxide, titanium oxide, beryllium oxide, aluminum nitride, and boron nitride, and at least one metal powder selected from among aluminum, gold, silver, copper, iron, nickel, and stainless steel.

The average particle size of component (C) is up to 50 μm, typically 0.1 to 50 μm, preferably 0.2 to 30 μm, and more preferably 0.2 to 20 μm, though not particularly limited. If the average particle size exceeds 50 μm, outer appearance and dispersion may be adversely affected, and when a liquid silicone rubber is allowed to stand, the heat conductive filler will settle down. If the average particle size is less than 0.1 μm, the composition may have an extremely low filling factor and a higher viscosity and become awkward to handle. As used herein, the average particle size may be determined as a cumulative weight average value ($D_{50}$) or median diameter in particle size distribution measurement, for example, by the laser light diffraction method.

As to the shape, the heat conductive filler is preferably of rounded near-spherical shape. This is because particles of more rounded shape are effective for preventing a viscosity buildup even on heavy loading. Examples of the inexpensive spherical heat conductive filler include spherical alumina AS series from Showa Denko K.K. and high purity spherical alumina AO series from Admatechs Co., Ltd. By combining a large particle size powder fraction and a small particle size powder fraction in a ratio conformal to the closest packing theory distribution curve, an improved filling factor, a lower viscosity and a higher thermal conductivity may be achieved.

The amount of component (C) blended is 5 to 4,000 parts, preferably 100 to 3,500 parts, more preferably 500 to 3,000 parts, and even more preferably 1,000 to 2,500 parts by weight per 100 parts by weight of component (A). If the amount of component (C) is less than 5 parts, the resulting silicone rubber may be less heat conductive. If the amount exceeds 4,000 parts, undesirably it may be difficult to load the silicon adhesive composition with such a large amount of filler, and the composition may have too high a viscosity to mold or work.

[Component (D)]

Component (D) is a hydrosilylation reaction catalyst which is added in order to promote the cure of the composition, preferably a platinum group metal based catalyst. Suitable platinum group metal based catalysts include, for example, platinum based catalysts, rhodium based catalysts, iridium based catalysts, palladium based catalysts, and ruthenium based catalysts, with the platinum based catalysts being preferred.

Examples of the catalyst include platinum-based catalysts, for example, platinum fine powder, platinum black, chloroplatinic acid, platinum tetrachloride, alcohol-modified chloroplatinic acid, platinum-olefin complexes, platinum-alkenylsiloxane complexes, platinum-carbonyl complexes, powdered thermoplastic organic resins containing the foregoing platinum-based catalysts, such as methyl methacrylate resins, polycarbonate resins, polystyrene resins, and silicone resins; rhodium-based catalysts of the formulae: [Rh($O_2CCH_3$)$_2$], Rh($O_2CCH_3$)$_3$, Rh$_2$($C_8H_{15}O_2$)$_4$, Rh($C_5H_7O_2$)$_3$, Rh($C_5H_7O_2$)(CO)$_2$, Rh(CO)[Ph$_3$P]($C_5H_7O_2$), RhX'$_3$, [(R$^5$)$_2$S]$_3$, (R$^6_3$P)$_2$Rh(CO)X', (R$^6_3$P)$_2$Rh(CO)H, Rh$_2$X'$_2$Y$_4$, H$_p$Rh$_q$(En)$_r$Cl$_s$, and Rh[O(CO)R$^5$]$_{3-t}$(OH)$_t$ wherein X' is hydrogen, chlorine, bromine or iodine, Y is an alkyl group (e.g., methyl or ethyl), CO, $C_8H_{14}$ or 0.5$C_8H_{12}$, R$^5$ is an alkyl, cycloalkyl or aryl group, R$^6$ is an alkyl, aryl, alkyloxy or aryloxy group, En is olefin, p is 0 or 1, q is 1 or 2, r is an integer of 1 to 4, s is 2, 3 or 4, and t is 0 or 1; and irridium-based catalysts of the formulae: Ir(OOCCH)$_3$, Ir($C_5H_7O_2$)$_3$, [Ir(Z)(En)$_2$]$_2$, or [Ir(Z)(Dien)]$_2$ wherein Z is chlorine, bromine, iodine or alkoxy group, En is olefin, and Dien is cyclooctadiene.

The amount of component (D) blended is not particularly limited as long as it is effective for the composition to cure (a sufficient amount to promote cure). Preferably, component (D) is blended in an amount to provide 0.000001 to 0.1 part, more preferably 0.00001 to 0.05 part by weight of metal atom per 100 parts by weight of component (A).

[Component (E)]

Component (E) is an organopolysiloxane containing at least one silyl group of the general formula (1) in the molecule and having a viscosity at 25° C. of 0.01 to 30 Pa·s, preferably 0.02 to 10 Pa·s, the polysiloxane having a cyclic structure-free skeleton.

$$SiR^1_aR^2_{3-a} \tag{1}$$

Herein R$^1$ is a substituted or unsubstituted monovalent hydrocarbon group, R$^2$ is an alkoxy or acyloxy group of 1 to 8 carbon atoms, and a is 0, 1 or 2.

Blending of component (E) ensures that the composition is easy to handle and mold and more self-adhesive to metals, glass and organic resins even when heavily loaded with the heat conductive filler as component (C).

If the viscosity at 25° C. of component (E) is less than 0.01 Pa·s, the adhesion enhancing effect may become insufficient. If the viscosity exceeds 30 Pa·s, undesirably workability may be adversely affected.

The molecular structure of component (E) is not particularly limited as long as its skeleton is not a cyclic structure. Exemplary structures include linear, partially branched linear, and branched structures. Most often, a substantially linear organopolysiloxane is preferred. Specifically, a linear diorganopolysiloxane whose molecular chain is mainly composed of recurring diorganosiloxane units and which has a silyl group of formula (1) introduced on side chain, and a linear diorganopolysiloxane blocked with a silyl group of formula (1) at one end of the molecular chain are preferred, and especially a linear diorganopolysiloxane blocked with a silyl group of formula (1) at both ends of the molecular chain is preferred.

In formula (1), R$^1$ is selected from substituted or unsubstituted monovalent hydrocarbon groups. Examples include alkyl groups such as methyl, ethyl, propyl, isopropyl, butyl, isobutyl, tert-butyl, hexyl, octyl, and decyl; aryl groups such as phenyl, tolyl, xylyl and naphthyl; cycloalkyl groups such as cyclopentyl and cyclohexyl; aralkyl groups such as benzyl, 2-phenylethyl and 3-phenylpropyl; and substituted forms of the foregoing hydrocarbon groups in which some or all carbon-bonded hydrogen atoms are replaced by halogen atoms (e.g., chlorine, bromine, and iodine), cyano groups or the like, such as chloromethyl, 2-bromoethyl, 3,3,3-trifluoropropyl, and cyanoethyl.

Among these, those compounds wherein R$^1$ is methyl, phenyl or a mixture thereof are preferred as component (E) because of ease of synthesis and chemical stability. Particularly when an organopolysiloxane having better solvent resistance is desired, it is preferred that R$^1$ be methyl, phenyl or a mixture thereof in combination with 3,3,3-trifluoropropyl.

If necessary, the group may contain aliphatic unsaturation, for example, alkenyl groups of 2 to 8 carbon atoms may be used. Suitable groups include vinyl, allyl, 1-propenyl, isopropenyl, 1-butenyl, isobutenyl and hexenyl. Inter alia, vinyl is preferred because of ease of synthesis and chemical stability.

In formula (1), R$^2$ is an alkoxy group of 1 to 8 carbon atoms such as methoxy, ethoxy, propoxy or butoxy, or an acyloxy group of 1 to 8 carbon atoms such as acetoxy. Inter alia, methoxy, ethoxy or a mixture thereof is preferred because of ease of synthesis.

In component (E), substituent groups on silicon atoms other than formula (1) are substituted or unsubstituted monovalent hydrocarbon groups, examples of which are the same as illustrated above for R$^1$. Of these monovalent hydrocarbon groups, methyl, phenyl, vinyl or a mixture of two or three is preferred from the aspect of synthesis.

Examples of component (E) include
molecular chain dual end trimethoxysiloxy-blocked dimethylsiloxane,
molecular chain dual end trimethoxysiloxy-blocked dimethylsiloxane/methylvinylsiloxane copolymer,
molecular chain dual end trimethoxysiloxy-blocked methylvinylpolysiloxane,
molecular chain dual end trimethoxysiloxy-blocked dimethylsiloxane/methylvinylsiloxane/methylphenylsiloxane copolymer,
molecular chain dual end trimethoxysiloxy-blocked dimethylsiloxane/methylvinylsiloxane/diphenylsiloxane copolymer,
molecular chain dual end dimethoxymethylsiloxy-blocked dimethylpolysiloxane,
molecular chain dual end dimethoxyvinylsiloxy-blocked dimethylpolysiloxane,
molecular chain dual end dimethoxyvinylsiloxy-blocked methylvinylsiloxane,
molecular chain dual end dimethoxyvinylsiloxy-blocked dimethylsiloxane/methylvinylsiloxane copolymer,
molecular chain dual end dimethoxyvinylsiloxy-blocked dimethylsiloxane/methylvinylsiloxane/methylphenylsiloxane copolymer,
molecular chain dual end dimethoxyvinylsiloxy-blocked dimethylsiloxane/methylvinylsiloxane/diphenylsiloxane copolymer,
molecular chain dual end divinylmethoxysiloxy-blocked dimethylpolysiloxane, and
molecular chain single end trimethoxysiloxy-blocked dimethylsiloxane.

These organopolysiloxanes may be used alone or in admixture of two or more while a mixture of organopolysiloxanes having different degrees of polymerization is also acceptable.

The amount of component (E) blended is 0.1 to 100 parts, preferably 0.1 to 50 parts, more preferably 1 to 30 parts by weight per 100 parts by weight of the organopolysiloxane as component (A). If the amount is less than 0.1 part, flow may be substantially poor. If the amount exceeds 100 parts, the desired mechanical strength may not be obtained.

[Component (F)]

Component (F), which is essential for enhancing the thermal conductivity of the composition, is acetylene black obtained from pyrolysis of acetylene and having a bulk density of 0.06 to 0.18 g/cm'. Since acetylene black of this type has a high structure (chain of particles) and high crystallinity, it largely contributes to an improvement in the thermal conductivity of the composition even when added in a small amount.

If the bulk density of component (F) is less than 0.06 g/cm$^3$, the composition may become difficult to handle due to severe scattering during milling. If the bulk density exceeds 0.18 g/cm$^3$, undesirably the composition may become difficult to mill uniformly. It is noted that component (F) may be used alone or in admixture of two or more as long as the bulk density is in the range of 0.06 to 0.18 g/cm$^3$.

The amount of component (F) blended is 0.01 to 10 parts, preferably 0.05 to 5 parts, more preferably 0.1 to 3 parts by weight per 100 parts by weight of the organopolysiloxane as component (A). If the amount is less than 0.01 part, an improvement in thermal conductivity may not be noticeable. If the amount exceeds 10 parts, the flow of the composition may become substantially poor despite a noticeable improvement in thermal conductivity.

[Other Components]

In the heat conductive silicone adhesive composition for reactors according to the invention, a crosslinking agent also serving as a hardness modifier such as an organohydrogenpolysiloxane free of alkoxy groups and containing at least two silicon-bonded hydrogen atoms in the molecule, other than component (B), a cure retarder (or cure reaction inhibitor) such as acetylene alcohol compounds or alkenyl-containing siloxane oligomers, a heat resistance improver such as cerium oxide, and a coloring pigment such as organic or inorganic coloring pigments may be admixed as long as the objects of the invention are not impaired.

[Preparation of Heat Conductive Silicone Adhesive Composition for Reactors]

The heat conductive silicone adhesive composition for reactors may be prepared from the foregoing components by any well-known mixing methods. Because of the reactive composition, it is preferred for efficient operation to prepare the composition of one-part or two-part type.

The one-part composition may be constructed through the following steps (I) to (III), for example.

(I) Components (A) and (C) are premixed to form a premix of components (A) and (C) and component (E) is added to the premix, or components (A), (C) and (E) are simultaneously mixed, obtaining a mixture of components (A), (C) and (E). At this point, the surface of component (C) is treated with components (A) and (E). Heat treatment may be conducted, for example, at about 150° C. to promote the surface treatment.

(II) Component (D) is added to and mixed with the mixture of components (A), (C) and (E) resulting from step (I), obtaining a mixture of components (A), (C), (D) and (E).

(III) A suitable amount of a cure retarder (or cure reaction inhibitor) such as an acetylene alcohol compound or alkenyl-containing siloxane oligomer is optionally added to and mixed with the mixture of components (A), (C), (D) and (E) resulting from step (II), and components (B) and (F) are added to and mixed with the mixture, obtaining a final composition containing components (A), (B), (C), (D), (E) and (F).

The one-part composition thus obtained has the advantages that a uniform composition is obtainable by optionally adjusting the mixing time of step (III) when the cure retarder is contained, and a sufficient time is allowed for the potting operation of the composition.

Also, the two-part composition may be constructed in any desired combination of components as long as components (A), (B) and (D) are not co-present. For example, a two-part composition may be constructed from a mixture A consisting of components (A), (C), (D) and (E) and a mixture B consisting of components (B) and (F) while a suitable amount of a cure retarder (or cure reaction inhibitor) such as an acetylene alcohol compound or alkenyl-containing siloxane oligomer is optionally added to and mixed with one or both of mixtures A and B. Immediately before use, the two mixtures are mixed, obtaining the same advantages as the one-part composition.

The two-part composition is superior to the one-part composition in that since two mixtures are previously prepared and mixed together on use, the lead time for the potting operation is shortened. On the other hand, the one-part composition is superior to the two-part composition in that since all components are mixed in sequence on use, this prevents components from being altered due to a combination or during storage. Accordingly, a choice may be made between one-part and two-part compositions in consideration of the advantages of each type and in compliance with a service situation.

[Manufacture of Reactor]

Another embodiment of the invention is a reactor potted in the heat conductive silicone adhesive composition.

As shown in FIG. 2, for example, the reactor is constructed by winding an insulated copper wire around a dust core 4 of magnetic material to form a coil body 5, placing the coil body 5 in a metal case 6 of aluminum or the like, potting or cast molding the composition into the space so that the coil body 5 is embedded in the composition, and curing the composition. Notably, the components including coil body 5 and metal case 6, the dispenser for potting, and the potting method used herein may be selected from well-known components and technologies.

The heat conductive silicone adhesive composition may be cured at normal temperature (typically about 10 to 30° C.) or at elevated temperature, depending on the geometry and size of coil body 5 and metal case 6 and the design of reactor manufacturing line.

Where the composition is cured at elevated temperature, heating may be at 60 to 200° C., preferably 80 to 180° C. for 1 to 120 minutes, preferably 5 to 60 minutes. If necessary, this may be followed by secondary cure treatment at 150 to 230° C. for 10 minutes to 4 hours.

The heat conductive silicone adhesive composition is fully adherent to metals such as aluminum, magnesium, iron, nickel and copper, glass such as float glass and strengthened glass, and organic resins such as polycarbonate (PC), polybutylene terephthalate (PBT), polyphenylene sulfide (PPS), acrylic resins, and epoxy resins.

Also desirably, in formulating the heat conductive silicone adhesive composition, the amounts of components are adjusted within the above-described range such that its cured product may have a thermal conductivity of at least 0.5 W/m·K, more preferably 0.8 to 6.0 W/m·K as measured by the hot wire method (quick thermal conductivity meter QTM-500 by Kyoto Electronics Mfg. Co., Ltd.). With a thermal conductivity of less than 0.5 W/m·K, the accumulated heat may interfere with the voltage boosting function of the reactor. If the thermal conductivity exceeds 6.0 W/m·K, the composition may become less flowable and quite difficult to pot around the reactor.

EXAMPLE

Examples and Comparative Examples are given below for illustrating the invention although the invention is not limited thereto.

The measurements of the hardness, tensile strength, elongation at break, tensile shear bond strength, thermal conductivity, and flow of a silicone elastomer at the initial, after heat treatment and after moist-heat treatment, and the measurement of reactor performance were carried out as follows. All properties of silicone elastomer are measurements at 25° C.

[Initial]

Physical properties of a silicone elastomer at the initial were measured as follows.

[Hardness]

A silicone elastomer composition was press cured at 120° C. for 10 minutes and heated in an oven at 120° C. for 50 minutes into a silicone elastomer sheet of 2 mm thick. A stack of three sheets was measured for hardness by Durometer Type A according to JIS K-6253.

[Tensile Strength and Elongation at Break]

A silicone elastomer composition was press cured at 120° C. for 10 minutes and heated in an oven at 120° C. for 50 minutes into a silicone elastomer sheet of 2 mm thick. The sheet was measured for tensile strength and elongation at break according to JIS K-6251.

[Tensile Shear Bond Strength]

A silicone elastomer composition was sandwiched between aluminum plates of 1.0 mm thick (JIS H-4000 A1050P) such that the elastomer might have a thickness of 2.0 mm and a bonding area of 25 mm×10 mm, and heat cured at 120° C. for 1 hour, obtaining an adhesion test specimen. Separately, a silicone elastomer composition was sandwiched between coil wires having a thickness of 1.5-1.6 mm and a width of 6.5-6.7 mm such that the elastomer might have a thickness of 1.0 mm and a bonding area of 6.5-6.7 mm×12.5 mm, and cured under similar conditions, obtaining an adhesion test specimen. The specimens were measured for tensile shear bond strength according to JIS K-6850.

[Thermal Conductivity]

A silicone elastomer composition was press cured at 120° C. for 10 minutes and heated in an oven at 120° C. for 50 minutes. The resulting silicone elastomer composition sample of 50 mm×110 mm×8 mm was measured for thermal conductivity by a quick thermal conductivity meter QTM-500 (Kyoto Electronics Mfg. Co., Ltd.) according to the hot wire method.

[Flow]

As shown in FIG. 1, a 0.6 cm³ portion of a silicone elastomer composition 1 was taken and dropped on an aluminum plate 2 (JIS H-4000, 0.5×25×250 mm). Immediately after dropping, the Al plate was inclined at an inclination angle α of 28 degrees (see FIGS. 1(A) and (B)), and held in an atmosphere of 23 (±2)° C. After 23 (+2)° C.×1 hour holding, the Al plate was taken out and the length L of flowing silicone elastomer composition 1' between upstream and downstream ends was measured (see FIGS. 1(C) and (D)). This test method is very important for evaluating the flow of a silicone elastomer composition. This method is conducted simply by inclining the Al plate. The surface state of Al plates is set uniform since Al plates according to the JIS standards are used. Although an inclination angle of 28° is optimum, the inclination angle may vary in a range of 26° to 30°. If the angle is less than 26°, the composition may flow short. If the angle exceeds 30°, even those compositions which are less flowable may fall in the acceptable flow range. With respect to the amount of the composition to be dropped, since the volume is more important than the weight, a means of metering a 0.6 ml portion by a syringe or the like and dispensing is effective with the additional advantage of a minor error. It is important to meter a volume of 0.6 ml±10%. If the volume is smaller than 0.6 ml−10%, even a flowable composition may be rated unacceptable. If the volume is larger than 0.6 ml+10%, even a less flowable composition may be rated acceptable.

The silicone elastomer composition should have a flow of at least 50 mm, preferably for effective filling at least 60 mm, and more preferably at least 80 mm, as measured by the above test. Although a longer flow leads to better results, the upper limit of flow is preferably about 250 mm, especially about 180 mm.

[After Heat Treatment]

The test specimens used in the measurement of initial physical properties of silicone elastomer were heated in an oven at 170° C. for 1,000 hours, before the same physical properties were similarly measured.

[After Moist-Heat Treatment]

The test specimens used in the measurement of initial physical properties of silicone elastomer were heated in an oven at 85° C. and 85% RH for 1,000 hours, before the same physical properties were similarly measured.

[Reactor Performance]

As shown in FIG. 2, a coil body 5 was placed in a case 6, which was filled with a silicone elastomer composition. The composition was cured by heating at 120° C. for 1 hour, completing a reactor 3. Electricity is conducted across the reactor 3 in a predetermined electric conduction pattern, while the temperatures (initial thermal properties) of coil body 5 and potted material (i.e., cured product of the composition) was measured.

Next, there were furnished a reactor 3 which was heat aged by heating at 170° C. for 1,000 hours, and a reactor 3 which was moist-heat aged by heating at 85° C. and 85% RH for 1,000 hours. Electricity is conducted across each aged reactor in the same conduction pattern as at the initial, while the temperatures (thermal properties after heat aging and moist-heat aging) of coil body 5 and potted material were measured. Then a temperature difference (change of reactor performance) between the initial thermal properties and the heat or heat-moist aged thermal properties was computed.

Example 1

A silicone base compound was prepared by mixing on a mixer Hivis Mix (Premix Corp.) 80.0 parts by weight of a molecular chain dual end dimethylvinylsiloxy-blocked dimethylpolysiloxane having a viscosity of 400 mPa·s (vinyl content of 0.185 mol/100 g), 500.0 parts by weight of spherical alumina powder having an average particle size of 9.5 μm (Admafine® AO-41R by Admatechs Co., Ltd.), 15.0 parts by weight of a dimethylsiloxane having formula (i):

[Chemical Formula 3]

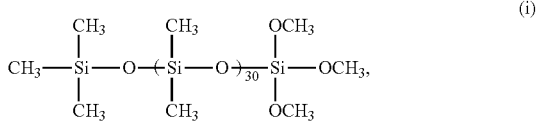

and 5.0 parts by weight of a molecular chain dual end trimethoxysiloxy-blocked dimethylpolysiloxane having a viscosity of 900 mPa·s at room temperature for 15 minutes, and heat treating under a reduced pressure of −0.09 MPa and 150° C. for 2 hours.

To the base compound which was cooled to room temperature were added 1.50 parts by weight (to give 0.85 mole of silicon-bonded hydrogen in total per mole of vinyl groups on dimethylpolysiloxanes in the base compound) of a hydrogenpolysiloxane having formula (ii):

[Chemical Formula 4]

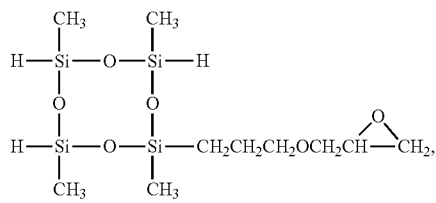

(ii)

0.35 part by weight (to give 0.15 mole of silicon-bonded hydrogen in total per mole of vinyl groups on dimethylpolysiloxanes in the base compound) of a hydrogenpolysiloxane having formula (iii):

[Chemical Formula 5]

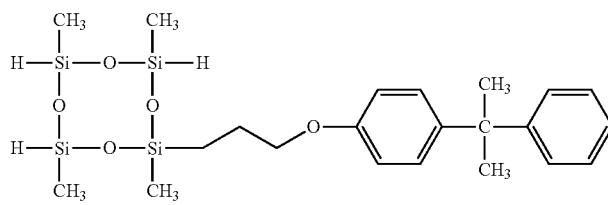

(iii)

0.15 part by weight of ethynyl cyclohexanol and 0.3 part by weight of triallyl isocyanurate as cure reaction inhibitor, and 1.0 part by weight of acetylene black obtained from pyrolysis of acetylene and having a bulk density of 0.15 g/cm³ (HS-100 by Denki Kagaku Kogyo Co., Ltd.). Finally, 0.2 part by weight (to give 30 parts by weight of metallic platinum per 1,000,000 parts by weight of dimethylpolysiloxanes in the base compound) of a 1,3-divinyltetramethyldisiloxane solution of platinum 1,3-divinyltetramethyldisiloxane complex was added. The contents were mixed at room temperature for 15 minutes, obtaining a silicone elastomer composition.

Example 2

A silicone elastomer composition was prepared as in Example 1 aside from changing the amount of spherical alumina powder having an average particle size of 9.5 μm (Admafine® AO-41R by Admatechs Co., Ltd.) to 700.0 parts by weight.

Example 3

A silicone elastomer composition was prepared as in Example 1 aside from changing the amount of spherical alumina powder having an average particle size of 9.5 μm (Admafine® AO-41R by Admatechs Co., Ltd.) to 400.0 parts by weight.

Comparative Example 1

A silicone elastomer composition was prepared as in Example 1 aside from using 1.65 parts by weight (to give 0.85 mole of silicon-bonded hydrogen in total per mole of vinyl groups on dimethylpolysiloxanes in the base compound) of a hydrogenpolysiloxane having formula (iv) instead of the siloxane of formula (ii).

[Chemical Formula 6]

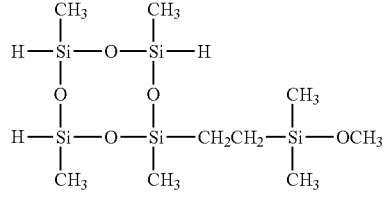

(iv)

Comparative Example 2

A silicone elastomer composition was prepared as in Example 1 aside from using 2.85 parts by weight (to give 0.85 mole of silicon-bonded hydrogen in total per mole of vinyl groups on dimethylpolysiloxanes in the base compound) of a hydrogenpolysiloxane having formula (v) instead of the siloxane of formula (ii).

[Chemical Formula 7]

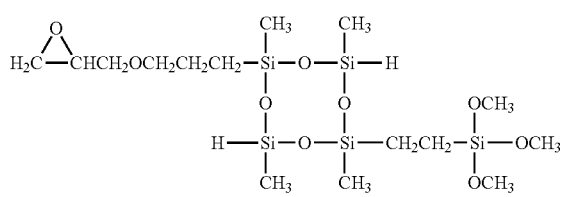

(v)

Comparative Example 3

A silicone elastomer composition was prepared as in Example 1 aside from omitting 1.0 part by weight of acetylene black having a bulk density of 0.15 g/cm³ (HS-100 by Denki Kagaku Kogyo Co., Ltd.).

TABLE 1

|  | Example | | | Comparative Example | | |
| --- | --- | --- | --- | --- | --- | --- |
|  | 1 | 2 | 3 | 1 | 2 | 3 |
| Flow (mm) | 245 | 156 | >248 | 241 | 229 | >248 |
| Hardness (Type A), initial | 18 | 28 | 15 | 21 | 16 | 18 |
| Hardness (Type A) after heat treatment | 60 | 68 | 57 | 70 | 69 | 60 |
| Hardness (Type A) after moist-heat treatment | 38 | 45 | 34 | 66 | 68 | 38 |
| Elongation at break (%), initial | 100 | 50 | 110 | 120 | 130 | 110 |
| Elongation at break (%) after heat treatment | 90 | 40 | 100 | 50 | 50 | 100 |
| Elongation at break (%) after moist-heat treatment | 120 | 50 | 110 | 40 | 50 | 100 |
| Tensile strength (MPa), initial | 0.4 | 0.5 | 0.3 | 0.4 | 0.3 | 0.4 |
| Tensile strength (MPa) after heat treatment | 2.4 | 2.4 | 1.9 | 2.2 | 2.1 | 2.5 |
| Tensile strength (MPa) after moist-heat treatment | 1.0 | 1.2 | 0.8 | 1.7 | 1.8 | 0.9 |
| Al shear bond strength (MPa), initial | 0.4 | 0.5 | 0.4 | 0.4 | 0.3 | 0.3 |
| Al shear bond strength (MPa) after heat treatment | 1.6 | 1.8 | 1.5 | 1.5 | 1.3 | 1.6 |
| Al shear bond strength (MPa) after moist-heat treatment | 0.6 | 0.8 | 0.5 | 1.2 | 1.2 | 1.2 |
| Coil shear bond strength (MPa), initial | 0.4 | 0.5 | 0.4 | 0.4 | 0.4 | 0.3 |
| Coil shear bond strength (MPa) after heat treatment | 1.8 | 1.9 | 1.6 | 1.7 | 1.5 | 1.7 |
| Coil shear bond strength (MPa) after moist-heat treatment | 0.8 | 1.0 | 0.7 | 1.2 | 1.2 | 1.1 |
| Thermal conductivity (W/m · K), initial | 1.6 | 2.0 | 1.5 | 1.6 | 1.6 | 1.5 |
| Reactor performance change (° C.) after heat aging | +3.5 | — | — | +4.9 | — | — |
| Reactor performance change (° C.) after moist-heat aging | +0.1 | — | — | +10.2 | — | — |

It is demonstrated that silicone adhesive compositions (Comparative Examples 1 and 2) containing a liquid organohydrogenpolysiloxane containing at least 2 silicon-bonded hydrogen atoms in the molecule and containing an alkoxy group, the polysiloxane having a cyclic structure-containing skeleton, undergo substantial changes of physical properties after moist-heat treatment relative to the initial physical properties.

Reactor performance changes observed in Example 1 and Comparative Example 1 reveal that the results of Example 1 are superior, especially so after moist-heat aging.

It is also demonstrated that Examples 1 and 2 having acetylene black added thereto are improved in thermal conductivity over Comparative Example 3 without acetylene black.

INDUSTRIAL APPLICABILITY

According to the invention, there is obtained a reactor which is potted in a potting material having high thermal conductivity and experiencing little changes of physical properties even with heat or moist-heat aging. The invention is useful in the field of battery boosting converters for which it is desired to enhance the performance and reliability of the reactor, especially in the fields of HEV, PHEV, EV and FC.

REFERENCE SIGNS LIST 1 silicone elastomer composition
2 aluminum plate
3 reactor
4 dust core
5 coil body
6 case

The invention claimed is:
1. A heat conductive silicone adhesive composition for a reactor, comprising at least
(A) 100 parts by weight of an organopolysiloxane containing at least two silicon-bonded alkenyl groups in the molecule and having a viscosity of 0.05 to 1,000 Pa·s at 25° C.,
(B) 0.01 to 30 parts by weight of a liquid organohydrogenpolysiloxane having a viscosity of up to 100 mPa·s at 25° C., containing 2 to 10 silicon-bonded hydrogen atoms (SiH groups) in the molecule, free of alkoxy groups, containing at least one epoxy group bonded to a silicon atom via an alkylene group, the polysiloxane having a degree of polymerization of up to 15 and having a cyclic structure-containing skeleton,
(C) 5 to 4,000 parts by weight of a heat conductive filler,
(D) an amount to promote cure of the composition of a hydrosilylation catalyst,
(E) 0.1 to 100 parts by weight of an organopolysiloxane containing in the molecule at least one silyl group of the general formula (1):

wherein $R^1$ is a substituted or unsubstituted monovalent hydrocarbon group, $R^2$ is an alkoxy or acyloxy group of 1 to 8 carbon atoms, and a is 0, 1 or 2, and having a viscosity of 0.01 to 30 Pa·s at 25° C., the polysiloxane having a cyclic structure-free skeleton, and (F) 0.01 to 10 parts by weight of acetylene black obtained from pyrolysis of acetylene and having a bulk density of 0.06 to 0.18 g/cm$^3$, a molar ratio of SiH groups in component (B) to alkenyl groups in component (A), that is, SiH/alkenyl being 0.2/1 to 5.0/1.

2. The heat conductive silicone adhesive composition of claim 1 wherein component (B) is selected from organohydrogenpolysiloxanes having the following general formulae:

[Chemical Formula 1]

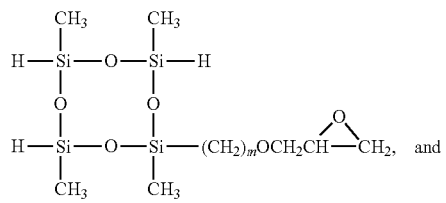

-continued

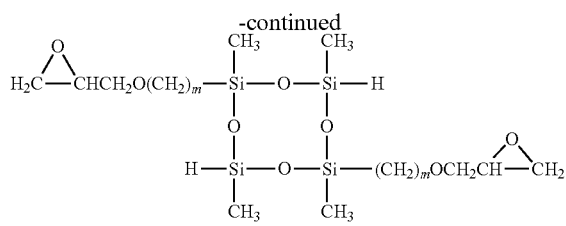

wherein m is an integer of 1 to 6.

3. The heat conductive silicone adhesive composition of claim 1 or 2 wherein component (C) is at least one member selected from the group consisting of aluminum hydroxide, magnesium hydroxide, aluminum oxide, crystalline silica, zinc oxide, silicon oxide, silicon carbide, silicon nitride, magnesium oxide, titanium oxide, beryllium oxide, aluminum nitride, boron nitride, gold, silver, copper, iron, nickel, aluminum, and stainless steel.

4. The heat conductive silicone adhesive composition of claim 1 wherein component (E) is selected from among
   molecular chain dual end trimethoxysiloxy-blocked dimethylsiloxane,
   molecular chain dual end trimethoxysiloxy-blocked dimethylsiloxane/methylvinylsiloxane copolymer,
   molecular chain dual end trimethoxysiloxy-blocked methylvinylpolysiloxane,
   molecular chain dual end trimethoxysiloxy-blocked dimethylsiloxane/methylvinylsiloxane/methylphenylsiloxane copolymer,
   molecular chain dual end trimethoxysiloxy-blocked dimethylsiloxane/methylvinylsiloxane/diphenylsiloxane copolymer,
   molecular chain dual end dimethoxymethylsiloxy-blocked dimethylpolysiloxane,
   molecular chain dual end dimethoxyvinylsiloxy-blocked dimethylpolysiloxane,
   molecular chain dual end dimethoxyvinylsiloxy-blocked methylvinylpolysiloxane,
   molecular chain dual end dimethoxyvinylsiloxy-blocked dimethylsiloxane/methylvinylsiloxane copolymer,
   molecular chain dual end dimethoxyvinylsiloxy-blocked dimethylsiloxane/methylvinylsiloxane/methylphenylsiloxane copolymer,
   molecular chain dual end dimethoxyvinylsiloxy-blocked dimethylsiloxane/methylvinylsiloxane/diphenylsiloxane copolymer,
   molecular chain dual end divinylmethoxysiloxy-blocked dimethylpolysiloxane, and
   molecular chain single end trimethoxysiloxy-blocked dimethylsiloxane.

5. The heat conductive silicone adhesive composition of claim 1, having a thermal conductivity of at least 0.5 W/m·K in the cured state.

6. A reactor potted in the heat conductive silicone adhesive composition of claim 1.

* * * * *